United States Patent  
Jiang et al.

(10) Patent No.: US 11,880,364 B2
(45) Date of Patent: Jan. 23, 2024

(54) PREDICTIVE RESOURCE ALLOCATION FOR DISTRIBUTED QUERY EXECUTION

(71) Applicant: Snowflake Inc., Bozeman, MT (US)

(72) Inventors: Qiming Jiang, Redmond, WA (US); Orestis Kostakis, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/157,233

(22) Filed: Jan. 25, 2021

(65) Prior Publication Data

US 2022/0237192 A1 Jul. 28, 2022

(51) Int. Cl.
*G06F 16/2453* (2019.01)
*G06F 16/2455* (2019.01)
*G06N 20/00* (2019.01)

(52) U.S. Cl.
CPC .... *G06F 16/24542* (2019.01); *G06F 16/2455* (2019.01); *G06N 20/00* (2019.01)

(58) Field of Classification Search
CPC .......... G06F 16/24542; G06F 16/2455; G06N 20/00
USPC ....................................................... 707/718
See application file for complete search history.

(56) References Cited

U.S. PATENT DOCUMENTS

| | | | | |
|---|---|---|---|---|
| 9,256,646 | B2 * | 2/2016 | Deshmukh | G06F 16/951 |
| 9,262,479 | B2 * | 2/2016 | Deshmukh | G06F 16/24568 |
| 10,909,114 | B1 * | 2/2021 | Virtuoso | G06F 16/2282 |
| 2018/0060394 | A1 * | 3/2018 | Gawande | G06F 9/50 |
| 2020/0050694 | A1 * | 2/2020 | Avalani | G06F 16/2455 |
| 2021/0034598 | A1 * | 2/2021 | Arye | G06F 16/288 |

OTHER PUBLICATIONS

"International Application Serial No. PCT/US2022/070217, International Preliminary Report on Patentability dated Aug. 3, 2023", 5 pgs.
"International Application Serial No. PCT/US2022/070217, International Search Report dated Feb. 8, 2022", 2 pgs.
"International Application Serial No. PCT/US2022/070217, Written Opinion dated Feb. 8, 2022", 3 pgs.

* cited by examiner

*Primary Examiner* — Hosain T Alam
*Assistant Examiner* — Saba Ahmed
(74) *Attorney, Agent, or Firm* — Schwegman Lundberg & Woessner, P.A.

(57) ABSTRACT

The subject technology receives a query directed to a set of source tables, each source table organized into a set of micro-partitions. The subject technology determines a set of metadata, the set of metadata comprising table metadata, query metadata, and historical data related to the query. The subject technology predicts, using a machine learning model, an indicator of an amount of computing resources for executing the query based at least in part on the set of metadata. The subject technology generates a query plan for executing the query based at least in part on the predicted indicator of the amount of computing resources. The subject technology executes the query based at least in part on the query plan.

19 Claims, 6 Drawing Sheets

500

```
RECEIVE A QUERY DIRECTED TO A SET OF SOURCE TABLES, EACH
SOURCE TABLE ORGANIZED INTO A SET OF MICRO-PARTITIONS
502
            │
            ▼
DETERMINE A SET OF METADATA, THE SET OF METADATA COMPRISING
TABLE METADATA, QUERY METADATA, AND HISTORICAL DATA
RELATED TO THE QUERY
504
            │
            ▼
PREDICT, USING A MACHINE LEARNING MODEL, AN INDICATOR OF AN
AMOUNT OF COMPUTING RESOURCES FOR EXECUTING THE QUERY
BASED AT LEAST IN PART ON THE SET OF METADATA
506
            │
            ▼
GENERATE A QUERY PLAN FOR EXECUTING THE QUERY BASED AT
LEAST IN PART ON THE PREDICTED INDICATOR OF THE AMOUNT OF
COMPUTING RESOURCES
508
            │
            ▼
EXECUTE THE QUERY BASED AT LEAST IN PART ON THE QUERY PLAN
510
```

*FIG. 5*

PREDICTIVE RESOURCE ALLOCATION FOR DISTRIBUTED QUERY EXECUTION

TECHNICAL FIELD

Embodiments of the disclosure relate generally to databases and, more specifically, to allocation of computing resource(s) to improve database query processing in a cloud data system.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

A cloud data warehouse (also referred to as a "network-based data warehouse" or simply as a "data warehouse") is a network-based system used for data analysis and reporting that comprises a central repository of integrated data from one or more disparate sources. A cloud data warehouse can store current and historical data that can be used for creating analytical reports for an enterprise based on data stored within databases of the enterprise. To this end, data warehouses typically provide business intelligence tools, tools to extract, transform, and load data into the repository, and tools to manage and retrieve metadata.

When certain information is to be extracted from a database, a query statement may be executed against the database data. A cloud data warehouse system processes the query and returns certain data according to one or more query predicates that indicate what information should be returned by the query. The data warehouse system extracts specific data from the database and formats that data into a readable form.

BRIEF DESCRIPTION OF THE DRAWINGS

The present disclosure will be understood more fully from the detailed description given below and from the accompanying drawings of various embodiments of the disclosure.

FIG. 5 is a flow diagram illustrating operations of a database system in performing a method, in accordance with some embodiments of the present disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The subject technology provides implementations to improve allocation of computing resource to execute queries in a cloud database system. In some existing cloud database systems, a customer (e.g., user) may have to specify an amount of computing resources (e.g., a number of servers) to utilize to execute a query. The customer may be charged based on the amount of computing resource, along with an amount of time that the query takes to execute using those computing resources. Thus, the total cost (e.g., in terms of money) for executing the query is directly related to the amount of computing resources used and the execution time of the query. If the customer specifies too many computing resources or too little computing resources to utilize for executing the query, this could increase the total cost for the user in unexpected and unwanted ways. Moreover, inaccurate allocation of computing resources introduces inefficiencies (e.g., wasting such resources) as these computing resources could remain idle, or become saturated thereby increasing execution time which causes increased utilization of such resources for a longer than expected period of time. To address at least the aforementioned issues, the subject system advantageously enables provisioning the appropriate amount of computing resources for executing queries, including individual SQL queries.

As described herein, implementations of the subject technology utilize several categories of information: local (query-specific) and global data to more accurately predict the amount of required compute resources. As mentioned herein, local historical data or information refers to knowledge extracted from the execution of the same query in the past. As also mentioned herein, global historical data or information has been curated from a plethora of queries as opposed to previous executions of only this specific query. Given the characteristics of a newly seen query, the subject system leverages knowledge of queries with similar characteristics to make an informed decision(s) regarding allocation of computing resources.

Figure 1:
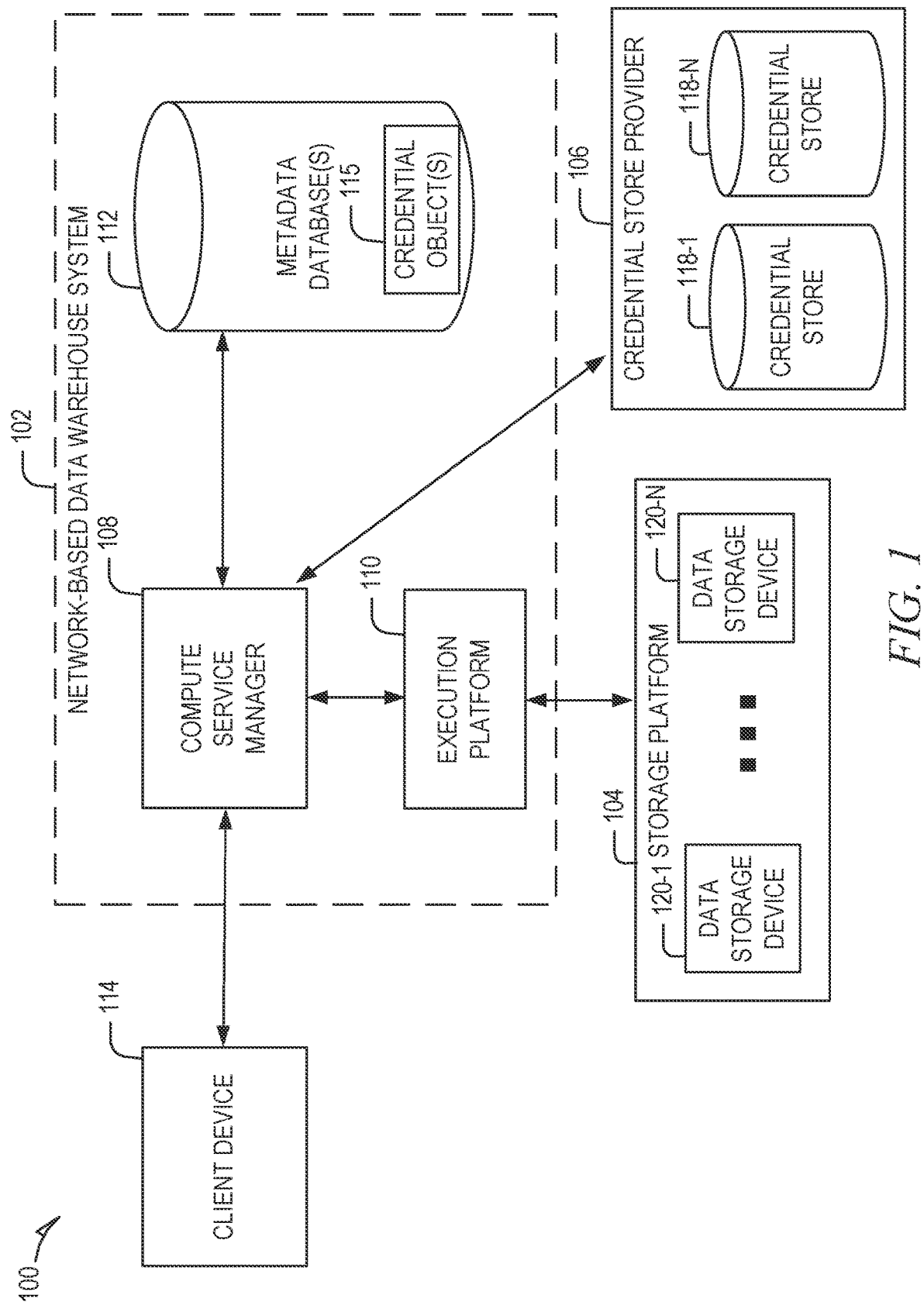
FIG. 1 illustrates an example computing environment that includes a network-based data warehouse system in communication with a cloud storage platform, in accordance with some embodiments of the present disclosure.

FIG. 1 illustrates an example computing environment 100 that includes a database system in the example form of a network-based data warehouse system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based data warehouse system 102 in communication with a cloud storage platform 104 (e.g., AWS®, Microsoft Azure Blob Storage®, or Google Cloud Storage), and a cloud credential store provider 106. The network-based data warehouse system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data warehouse system 102.

The network-based data warehouse system 102 comprises a compute service manager 108, an execution platform 110, and one or more metadata databases 112. The network-based data warehouse system 102 hosts and provides data reporting and analysis services to multiple client accounts.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data warehouse system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based data warehouse system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

In an embodiment, a data structure can be utilized for storage of database metadata in the metadata database 112. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enable the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database 112 includes EP files (expression property files), where each of the EP files store a collection of expression properties about corresponding data. Metadata may be stored for each column of each micro-partition of a given table. In an embodiment, the aforementioned EP files can be stored in a cache provided by the subject system for such EP files (e.g., "EP cache").

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
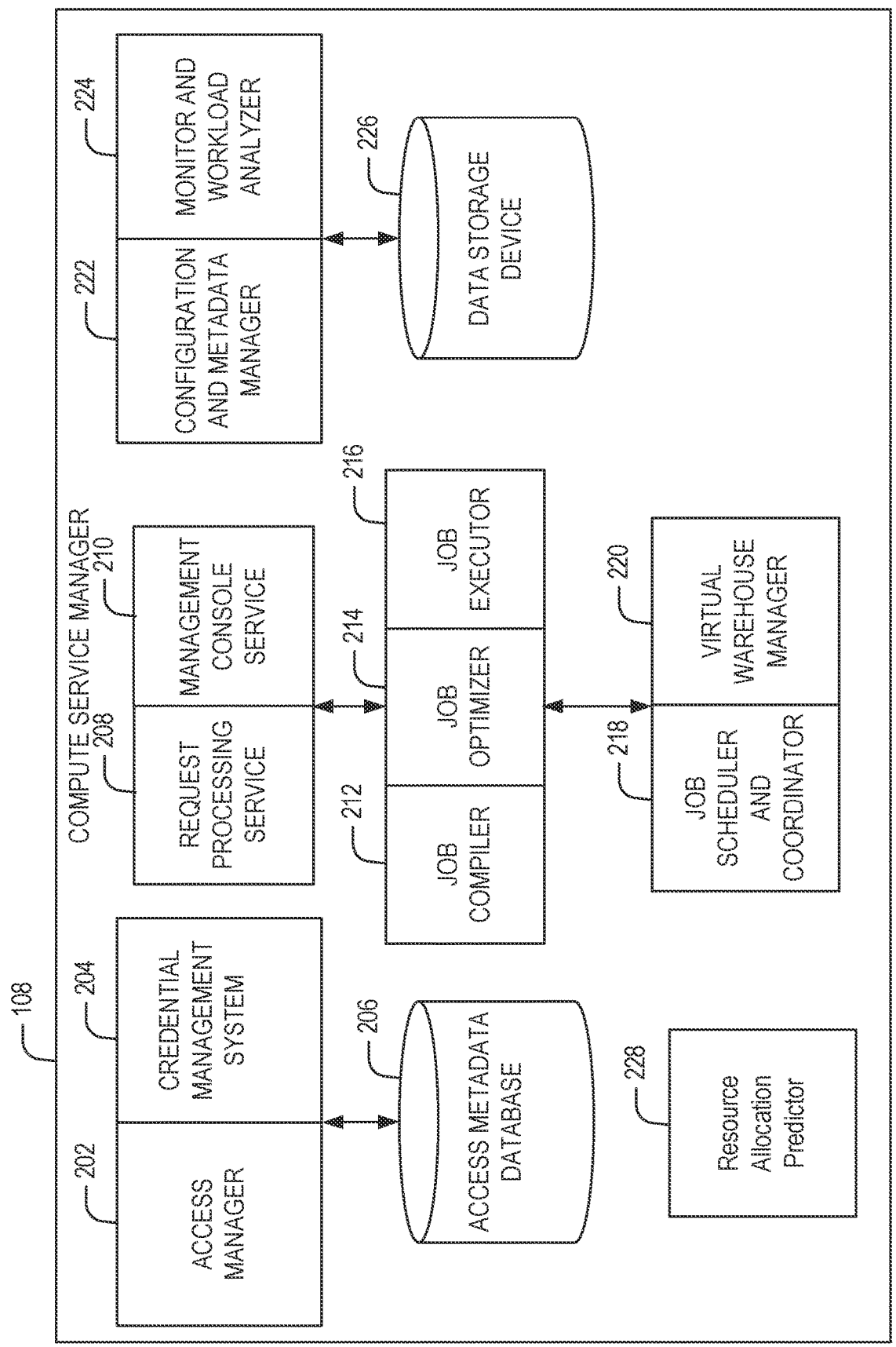
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job executor 216 executes the execution code for jobs received from a queue or determined by the compute service manager 108.

As further illustrated, the compute service manager 108 includes a resource allocation predictor 228, which is described in further detail in FIG. 4 below. In an example, the resource allocation predictor 228 can communicate with the job compiler 212. In an embodiment, the resource allocation predictor 228 generates a prediction for allocation of computing resources for execution of a given query and may return information regarding the same to the job compiler 212 so that a query plan can be generated utilizing the prediction.

As described further herein, the resource allocation predictor 228 can perform operations (e.g., using one or more of a machine learning model, heuristics, rules-based system, and the like) to generate a prediction of computing resources for allocation based at least in part on analyzing various metadata (e.g., query metadata, table metadata, query history, etc.) received from one or more metadata databases (e.g., metadata database(s) 112).

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. Alternatively or conjunctively, the job compiler 212 can generate query plans for executing received queries as discussed further herein.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
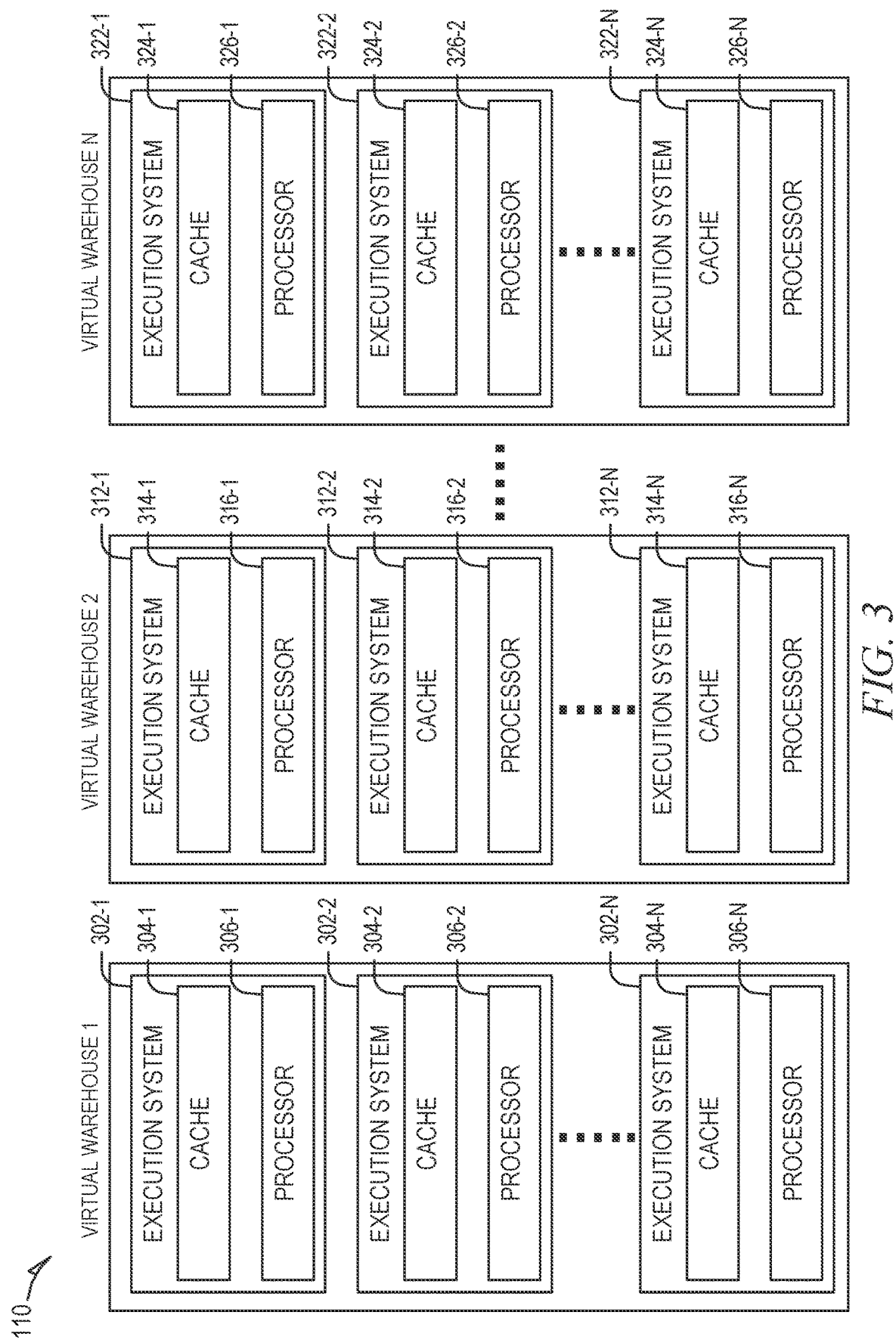
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-*n* includes a cache 324-*n* and a processor 326-*n*.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-*n* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Embodiments of the subject technology provide approaches to provisioning an appropriate amount of computing resources for executing individual queries (e.g., an SQL query, and the like). In the context of the subject system, such computing resources can be either individual servers or virtual warehouses as discussed before.

In an example where computing resources are under allocated, then it is possible that queries will take longer to execute, and in some instance can be monetarily more expensive, too, for the user(s). On the other hand, if computing resources are over allocated, a higher cost may be incurred since the additional resources will remain idle, or to make use of all resources the job compiler 212 and job scheduler and coordinator 218 might determine a sub-optimal query plan for executing the query. As discussed further herein, embodiments of the subject technology enable determining and allocating computing resources in cases where 1) prior knowledge of executing a specific query is unavailable, and 2) knowledge of executing a specific query in the past is available.

Figure 4:
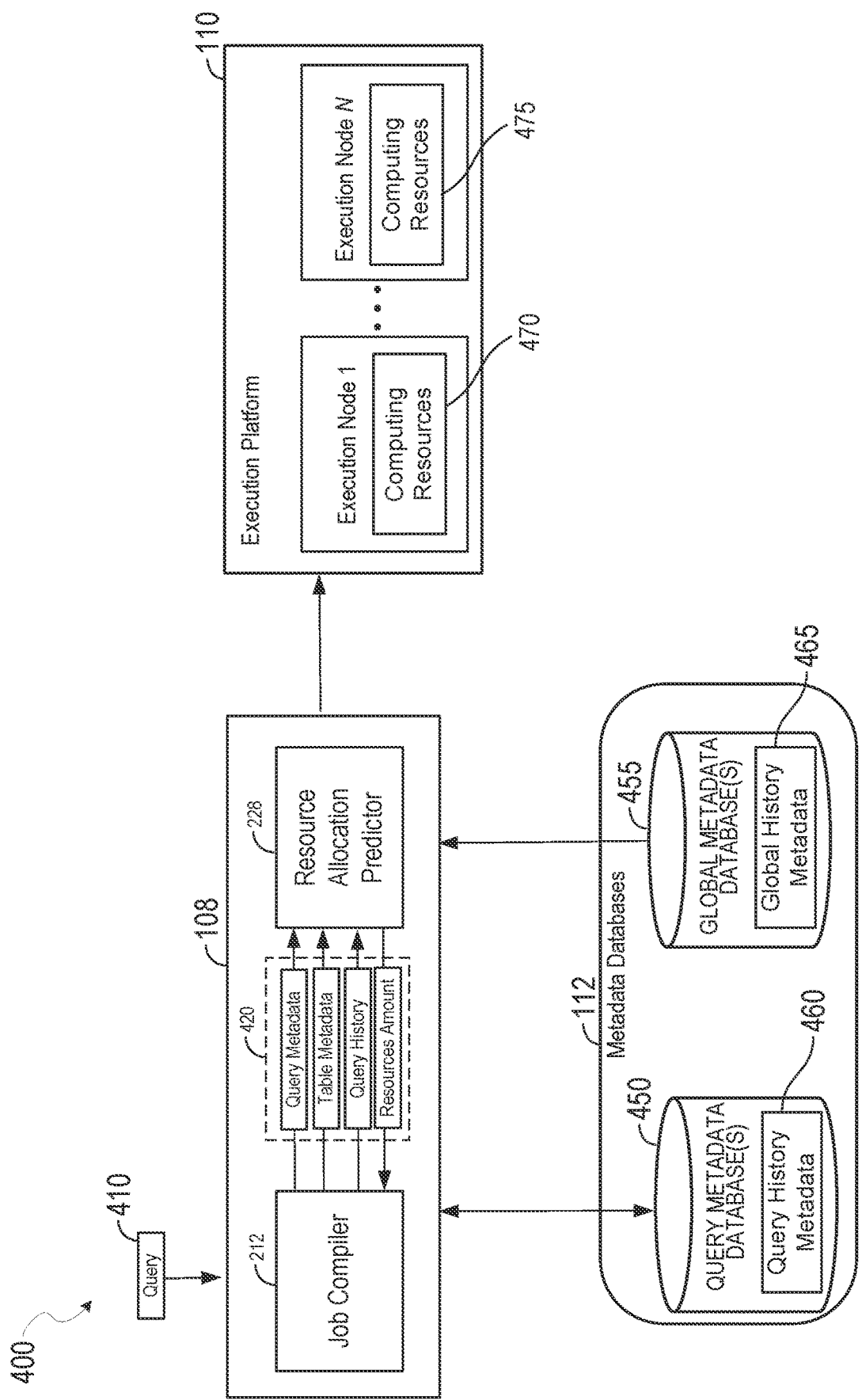
FIG. 4 is a computing environment conceptually illustrating an example software architecture for providing a prediction for computing resource(s) allocation for query execution, in accordance with some embodiments of the present disclosure.

FIG. 4 is a computing environment conceptually illustrating an example software architecture for providing a prediction for computing resource(s) allocation for query execution, which can be performed by the resource allocation predictor 228 of the compute service manager 108, in accordance with some embodiments of the present disclosure.

As illustrated, a query 410 can be received by the compute service manager 108. The compute service manager 108 forwards the query to the job compiler 212. As mentioned before, the job compiler 212 initiates operations to generate (e.g., compilation process) execution code for executing the query. In an embodiment, the job compiler 212 retrieves metadata 420 from one or more metadata database(s) 112 and halts the compilation process. As illustrated, the metadata 420 includes query metadata, table metadata, and query history information. In an embodiment, the job compiler 212 retrieves (e.g., by performing a lookup) query metadata and query history information from query metadata database(s) 450, which includes query history metadata 460 which at least some of the aforementioned query metadata, table metadata, and query history information are stored. Based at least in part on the retrieved metadata, the job compiler 212 determines whether query 410 has been executed previously (e.g., the same SQL query as the current query).

In an embodiment, the job compiler 212 generates relevant metadata based at least in part on the query metadata, table metadata, and query history information. The job compiler 212 forwards the relevant metadata to the resource allocation predictor 228 for analysis as part of generating a prediction of computing resources for allocation to execute query 410.

In an example, the relevant table-metadata generated by the job compiler 212 includes, but is not limited to, a number and total size of pages/micro-partition files, a number of rows, a number of referenced tables or table-aliases (e.g., for the case of join and self-join operations, respectively).

The aforementioned query metadata includes, but is not limited to, counts of different query-execution operations (e.g. join, filter, sample) and the query topology (query graph). In an example, a maximum degree of parallelism can be dependent upon a shape of the query graph. For example, a join operation of two tables after filtering can be parallelized, as compared to performing multiple consecutive operations on the same row-set.

The query history information (e.g., local query historical metadata) includes, but is not limited to, table metadata summaries of previous executions of queries, execution time, an amount of allocated resources, resource utilization values, and the like.

In an example, the resource allocation predictor 228 retrieves global historical information from global metadata database(s) 455, which may be stored in global history metadata 465. Based at least in part on the retrieved global historical information, the resource allocation predictor 228 generates output information corresponding to a prediction of computing resources to allocate for executing query 410.

Based at least in part on the global historical information of queries executed in parallel in a virtual warehouse(s) of various sizes, the resource allocation predictor 228 can generate an appropriate prediction for allocation of computing resources (e.g., a number of virtual warehouses and/or nodes) to execute query 410. In a first example, the resource allocation predictor 228 generates a prediction that parallelization (e.g., allocation of more or additional virtual warehouse or computing resources) is not needed since the query 410 runs in a given period of time (e.g., ~1 second) irrespective of other conditions (e.g., substantially the same execution time whether one virtual warehouse is utilized to execute query 410, or X+1 number of virtual warehouses is utilized to execute query 410), and therefore allocation of "smaller" virtual warehouses (e.g., with fewer execution node(s)) is cheaper and more optimal. In a second example, as a number of computing resources is allocated (e.g., number of virtual warehouses or nodes), execution time of query 410 decreases until reaching a parallelization limit. Thus, the resource allocation predictor 228 generates a prediction that allocation of a greater number of computing resources, but preferably below the parallelization limit, is recommended for executing query 410. In a third example, execution of query 410 becomes faster when adding more computing resources (e.g., nodes), but the execution time does not reduce as much proportionally to the amount of added servers. Thus, the total cost increases, and the resource allocation predictor 228 can generate a prediction indicating allocation of an amount of computing resources somewhat in the middle of the amount of computing resources that were analyzed for query execution. In yet another example, due to memory limits, the performance of executing query 410 increases (e.g., execution time decreases) in a super-linear manner when adding compute resources (e.g., servers or virtual warehouses) when the existing resources are few, but when adding more computing resources to already moderately-sized allocated compute resources, the execution time of query 410 does not reduce as quickly. Thus, the cost increases, and the resource allocation predictor 228 can generate a prediction to allocate computing resources that is past a number of virtual warehouses beyond the super-linear portion but less than a second number of virtual warehouses where execution time does not reduce as drastically.

The aforementioned global historical information can be either built into the resource allocation predictor 228 (e.g., where ML models are pre-trained), or be used as an additional input source.

In an example, global historical information can be something other than a fixed dataset. Ongoing and future query executions can be included (e.g., added) in the global metadata database(s) 455 upon query-execution termination, thereby creating a "richer" dataset over time.

In the context of ML, this has the implication that new and improved ML models can be trained and deployed over time to replace the previous ML models. In an example, replacing such ML models does not have to be instantaneous, instead it can follow "flighting" strategies (e.g., the new model(s) is originally introduced to a small subset of all queries/customers and gradually receives increased workloads until completely replacing the previous model).

In an embodiment, the resource allocation predictor 228 can be an implementation of a decision-based system, with rules created by human domain experts (e.g., expert system), or automatically created by computer methods (e.g., one or more machine learning (ML) models). The resource allocation predictor 228 module may therefore implement multiple underlying mechanisms for making the decisions (e.g., generating a prediction for allocating computing resources to execute query 410). In an example, these mechanisms are applied/utilized in several modes:

a) independently: for specific query types (based on information from the compute service manager 108 and/or the job compiler 212), resource allocation predictor 228 utilizes a specific mechanism (e.g., ML model(s)) that has deployed taking into consideration possible specific intricacies of such queries. Further, instead of or in addition to the different query-types, particular mechanisms can be employed based on different users. As a result, this can lead to more personalized services for customers or customer groups (e.g., users or groups of users) with extraordinary requests.

b) ensemble/in parallel: multiple mechanisms are performed in parallel, and their decision(s) (e.g., output) is utilized by the resource allocation predictor 228 for voting-based outcomes, or as signals to aggregator methods such as ensemble-based ML models (e.g., where multiple ML algorithms or model may be utilized to determine a prediction).

In an embodiment, the output information is forwarded to the job compiler 212. After receiving the output information, the job compiler 212 generates a (finalized) query plan (e.g., final query execution plan) based on the indicated amount of available resources in the output information. In an embodiment, the job scheduler and coordinator 218 sends the finalized query plan to the appropriate node(s) (e.g., cluster of servers or nodes) in the execution platform 110 for executing query 410.

Depending on the resource allocation process, execution of the query 410 can be routed to the "most" appropriate batch of existing pre-allocated resources, or alternatively, the compute service manager 108 (or the job scheduler and coordinator 218) can request the allocation of new resources to the appropriate actor (e.g., execution node(s), virtual warehouse(s), and the like).

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based data warehouse system 102, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based data warehouse system 102.

At operation 502, the job compiler 212 receives a query directed to a set of source tables, each source table organized into a set of micro-partitions.

At operation 504, the job compiler 212 determines a set of metadata, the set of metadata comprising table metadata, query metadata, and historical data related to the query.

In an embodiment, the job compiler 212 analyzes the query against the historical data (e.g., query history) related to the query to determine whether a previous query, being a same query as the query, has been executed at a previous time prior to receiving the query. In response to the query not being executed at the previous time, in an embodiment, the job compiler 212 can include information (e.g., additional metadata) that indicates that the query has yet to be executed prior to forwarding the metadata. The job compiler 212 then forwards the set of metadata to the resource allocation predictor 228 for processing. In an embodiment, the job compiler 212 provides the set of metadata as input data to a machine learning model (as discussed below), for example, by forwarding the set of metadata to the resource allocation predictor 228.

At operation 506, the resource allocation predictor 228 predicts, using a machine learning model, an indicator of an amount of computing resources for executing the query based at least in part on the set of metadata.

In an embodiment, the resource allocation predictor 228 analyzes global history information of previous queries in which the global history information comprises query execution times of the previous queries and corresponding computing resources utilized to execute the previous queries, and can provide information related to the global history information as an (additional) input data to the machine learning model. It is appreciated that the resource allocation predictor 228 can analyze global history information irrespective of whether the query has been executed before, and therefore the resource allocation predictor 228 can perform the analysis of the global history information when the query has yet to be executed, while in other embodiments, the resource allocation predictor 228 analyzes the global history information even when the query has been executed before.

The resource allocation predictor 228 runs the machine learning model to generate a value indicating the amount of computing resources for executing the query, the value corresponding to a prediction of the amount of computing resources to utilize for executing the query in an execution platform. The machine learning model provides output data corresponding to the amount of computing resources to allocate (which is then used by a query compiler when generating a query plan), and the resource allocation predictor 228 provides the value indicating the amount of computing resources to the job compiler 212.

In an embodiment, the machine learning model receives the input data at an input layer of the machine learning model. The machine learning model forwards, from the input layer, at least the received input data to a hidden layer of the machine learning model. The machine learning model applies, by the hidden layer, an activation function to the received input data to generate first output data, the first output data being received by an output layer of the machine learning model. The machine learning model then applies, by the output layer, a second activation function to the first output data. The machine learning model provides second output data of the second activation function as the prediction of the amount of computing resources to utilize for executing the query in an execution platform. The resource allocation predictor 228 can receive the prediction and forward information related to the prediction to the job compiler 212 (e.g., for generating a query plan for the query). In this discussion above, it is also appreciated that in some embodiments, the machine learning model may not include a hidden layer(s) and instead include an input layer and an output layer. In yet other embodiments, the machine learning model can include multiple hidden layers instead of one as discussed in the example above. Additionally, although the above discussed relates to a discussion of one type of model (e.g., neural network, or deep neural network with many hidden layers), it is appreciated that other types of machine learning models may be deployed and utilized and still be within the scope of the subject technology. For example, the machine learning model may provide a regression model, ensemble model(s), or support vector machine (s).

In an embodiment, the resource allocation predictor 228, in predicting the indicator of the amount of computing resources, further (or in lieu of using the machine learning model) utilizes an expert system including a set of rules, the set of rules emulating a decision making of a human, the set of rules utilizing information stored in a knowledge base.

In an embodiment, the resource allocation predictor 228 determines that the stored global query metadata includes a threshold amount of new data since a previous time that the machine learning model was trained using a previous set of global query metadata. The resource allocation predictor 228 trains the machine learning model based at least in part on the retrieved global query metadata. The resource allocation predictor 228 then deploys the trained machine learning model as a new machine learning model to predict the indicator of the amount of computing resources for executing the query.

At operation 508, the job compiler 212 generates a query plan for executing the query based at least in part on the predicted indicator of the amount of computing resources. The job compiler 212 then forwards the generated query plan to the execution platform 110 to execute the query. Alternatively, the job compiler 212 can forward the generated query plan to the job scheduler and coordinate 218, which in turn can schedule and forward the query plan to the execution platform 110 for execution.

At operation 510, the execution platform 110 executes the query based at least in part on the query plan.

Figure 6:
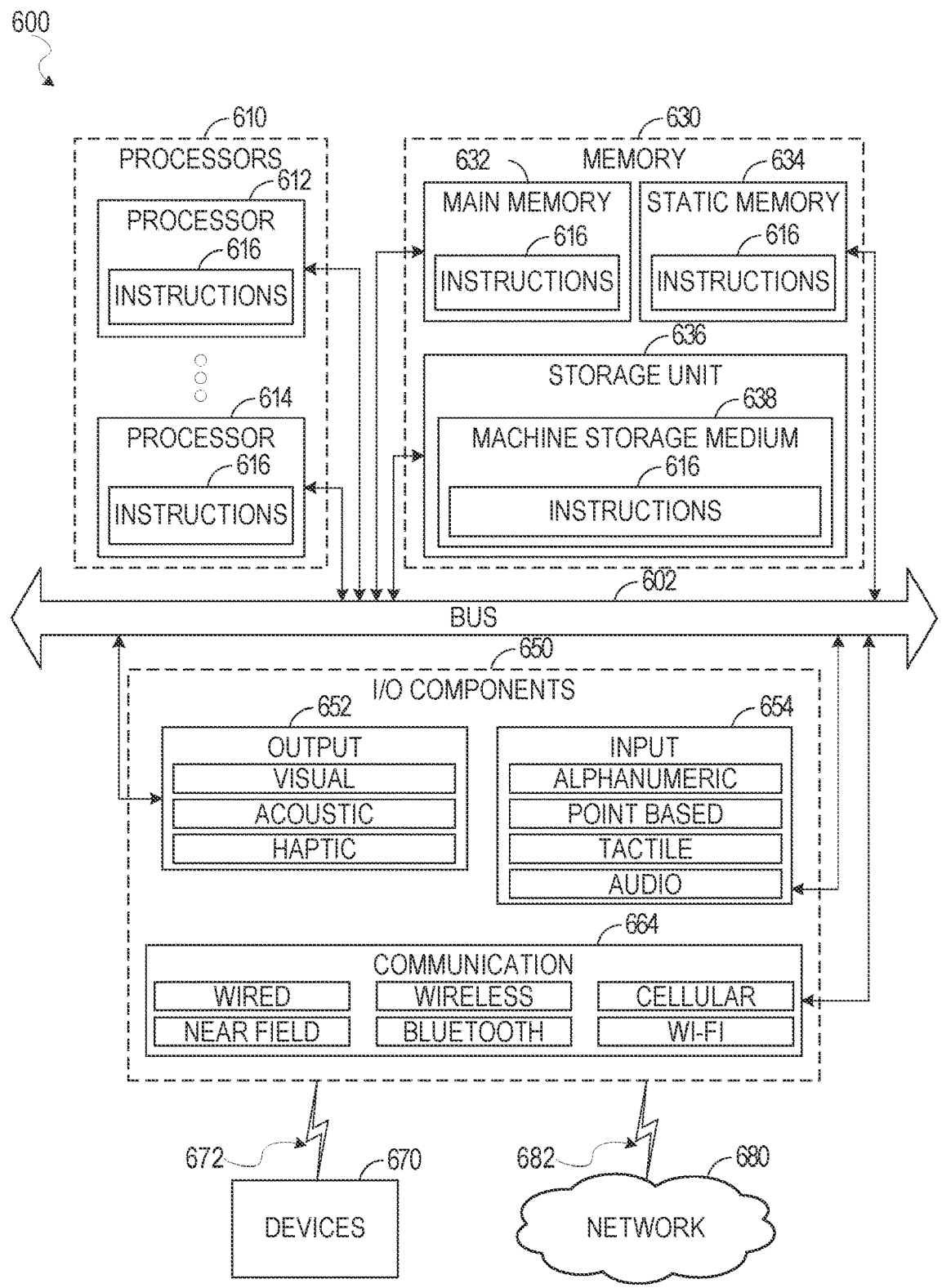
FIG. 6 illustrates a diagrammatic representation of a machine in the form of a computer system within which a set of instructions may be executed for causing the machine to perform any one or more of the methodologies discussed herein, in accordance with some embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute any one or more operations of the method 500. As another example, the instructions 616 may cause the machine 600 to implement portions of the data flows illustrated in at least FIG. 4. In this way, the instructions 616 transform a general, non-programmed machine into a particular machine 600 (e.g., the compute service manager 108 or a node in the execution platform 110) that is specially configured to carry out any one of the described and illustrated functions in the manner described herein.

In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 includes processors 610, memory 630, and input/output (I/O) components 650 configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within machine storage medium 638 of the storage unit 636, within at least one of the processors 610 (e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components to provide communication via other modalities. The devices 670 may be another machine or any of a wide variety of peripheral devices (e.g., a peripheral device coupled via a universal serial bus (USB)). For example, as noted above, the machine 600 may correspond to any one of the compute service manager 108 or the execution platform 110, and the devices 670 may include the client device 114 or any other computing device described herein as being in communication with the network-based data warehouse system 102 or the cloud storage platform 104.

Executable Instructions and Machine Storage Medium

The various memories (e.g., 630, 632, 634, and/or memory of the processor(s) 610 and/or the storage unit 636) may store one or more sets of instructions 616 and data structures (e.g., software) embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   receiving a query directed to a set of source tables, each source table organized into a set of micro-partitions;
   determining a set of metadata, the set of metadata comprising table metadata, query metadata, and historical data related to the query;
   predicting, using a machine learning model, an indicator of an amount of computing resources for executing the query by applying the set of metadata comprising the table metadata, the query metadata, and the historical data related to the query as input to the machine learning model, the machine learning model trained to generate a prediction of the amount of computing resources for queries based on inputted table metadata, query metadata, and historical data related to queries, the amount of computing resources comprising a number of virtual warehouses predicted to execute the query, the predicting, using the machine learning model, further comprising: generating a prediction for allocation of a number of additional virtual warehouses for executing the query by:
   identifying a parallelization limit for the received query, the parallelization limit corresponding to a number of virtual warehouses at which an execution time of the query no longer decreases as a result of increasing a number of additional virtual warehouses; and
   determining that the predicted amount of computing resources for executing the query corresponds to the parallelization limit;
   generating a query plan for executing the query based at least in part on the predicted indicator of the amount of computing resources; and
   executing the query based at least in part on the query plan.

2. The system of claim 1, wherein the operations further comprise:
   analyzing the query against the historical data related to the query to determine whether a previous query, being a same query as the query, has been executed at a previous time prior to receiving the query; and
   in response to the query not being executed at the previous time, analyzing global history information of previous queries, the global history information comprising query execution times of the previous queries and corresponding computing resources utilized to execute the previous queries.

3. The system of claim 1, wherein processing, using the machine learning model, at least the set of metadata comprises:
   providing the set of metadata as input data to the machine learning model;
   running the machine learning model to generate a value indicating the amount of computing resources for executing the query, the value corresponding to a prediction of the amount of computing resources to utilize for executing the query in an execution platform; and
   providing the value indicating the amount of computing resources to a query compiler to utilize when generating the query plan.

4. The system of claim 3, wherein running the machine learning model further comprises:
   receiving the input data at an input layer of the machine learning model;
   forwarding, from the input layer, at least the received input data to a hidden layer of the machine learning model;
   applying, by the hidden layer, an activation function to the received input data to generate first output data, the first output data being received by an output layer of the machine learning model; and
   applying, by the output layer, a second activation function to the first output data.

5. The system of claim 1, wherein predicting, using the machine learning model, the indicator of the amount of computing resources for executing the query by applying the set of metadata comprising the table metadata, the query metadata, and the historical data related to the query as input to the machine learning model further comprises:
   generating a particular prediction that parallelization is not needed for executing the query, the parallelization comprising an allocation of additional virtual warehouses to the number of virtual warehouse predicted to execute the query, the prediction that parallelization is not needed being based on determining that the query executes in a particular period of time that is a same execution time as when one virtual warehouse is being utilized to execute the query.

6. The system of claim 4, wherein the operations further comprise:

providing second output data of the second activation function as the prediction of the amount of computing resources to utilize for executing the query in an execution platform.

7. The system of claim 3, wherein the operations further comprise:
retrieving global query metadata from a database, the global query metadata comprising information of queries that were previously executed; and
providing the global query metadata as second input data to the machine learning model.

8. The system of claim 7, wherein the operations further comprise:
determining that the retrieved global query metadata includes a threshold amount of new data since a previous time that the machine learning model was trained using a previous set of global query metadata;
training the machine learning model based at least in part on the retrieved global query metadata; and deploying the trained machine learning model as a new machine learning model to predict the indicator of the amount of computing resources for executing the query.

9. The system of claim 1, wherein predicting the indicator of the amount of computing resources for executing the query is further based on an expert system including a set of rules, the set of rules emulating a decision making of a human, the set of rules utilizing information stored in a knowledge base.

10. A method comprising:
receiving, by one or more processors, a query directed to a set of source tables, each source table organized into a set of micro-partitions;
determining a set of metadata, the set of metadata comprising table metadata, query metadata, and historical data related to the query;
predicting, using a machine learning model, an indicator of an amount of computing resources for executing the query by applying the set of metadata comprising the table metadata, the query metadata, and the historical data related to the query as input to the machine learning model, the machine learning model trained to generate a prediction of the amount of computing resources for queries based on inputted table metadata, query metadata, and historical data related to queries, the amount of computing resources comprising a number of virtual warehouses predicted to execute the query, the predicting, using the machine learning model, further comprising: generating a prediction for allocation of a number of additional virtual warehouses for executing the query by:
identifying a parallelization limit for the received query, the parallelization limit corresponding to a number of virtual warehouses at which an execution time of the query no longer decreases as a result of increasing a number of additional virtual warehouses; and
determining that the predicted amount of computing resources for executing the query corresponds to the parallelization limit;
generating a query plan for executing the query based at least in part on the predicted indicator of the amount of computing resources; and
executing the query based at least in part on the query plan.

11. The method of claim 10, further comprising:
analyzing the query against the historical data related to the query to determine whether a previous query, being a same query as the query, has been executed at a previous time prior to receiving the query.

12. The method of claim 11, further comprising:
in response to the query not being executed at the previous time, analyzing global history information of previous queries, the global history information comprising query execution times of the previous queries and corresponding computing resources utilized to execute the previous queries.

13. The method of claim 10, wherein processing, using the machine learning model, at least the set of metadata comprises:
providing the set of metadata as input data to the machine learning model;
running the machine learning model to generate a value indicating the amount of computing resources for executing the query, the value corresponding to a prediction of the amount of computing resources to utilize for executing the query in an execution platform; and
providing the value indicating the amount of computing resources to a query compiler to utilize when generating the query plan.

14. The method of claim 13, wherein running the machine learning model further comprises:
receiving the input data at an input layer of the machine learning model.

15. The method of claim 14, further comprising:
forwarding, from the input layer, at least the received input data to a hidden layer of the machine learning model;
applying, by the hidden layer, an activation function to the received input data to generate first output data, the first output data being received by an output layer of the machine learning model; and applying, by the output layer, a second activation function to the first output data.

16. The method of claim 15, further comprising:
providing second output data of the second activation function as the prediction of the amount of computing resources to utilize for executing the query in an execution platform.

17. The method of claim 13, further comprising:
retrieving global query metadata from a database, the global query metadata comprising information of queries that were previously executed; and
providing the global query metadata as second input data to the machine learning model.

18. The method of claim 17, further comprising:
determining that the retrieved global query metadata includes a threshold amount of new data since a previous time that the machine learning model was trained using a previous set of global query metadata;
training the machine learning model based at least in part on the retrieved global query metadata; and deploying the trained machine learning model as a new machine learning model to predict the indicator of the amount of computing resources for executing the query.

19. A non-transitory computer-storage medium comprising instructions that, when executed by one or more processors of a machine, configure the machine to perform operations comprising:
receiving a query directed to a set of source tables, each source table organized into a set of micro-partitions;
determining a set of metadata, the set of metadata comprising table metadata, query metadata, and historical data related to the query;

predicting, using a machine learning model, an indicator of an amount of computing resources for executing the query by applying the set of metadata comprising the table metadata, the query metadata, and the historical data related to the query as input to the machine learning model, the machine learning model trained to generate a prediction of the amount of computing resources for queries based on inputted table metadata, query metadata, and historical data related to queries, the amount of computing resources comprising a number of virtual warehouses predicted to execute the query, the predicting, using the machine learning model, further comprising: generating a prediction for allocation of a number of additional virtual warehouses for executing the query by:
  identifying a parallelization limit for the received query, the parallelization limit corresponding to a number of virtual warehouses at which an execution time of the query no longer decreases as a result of increasing a number of additional virtual warehouses; and
  determining that the predicted amount of computing resources for executing the query corresponds to the parallelization limit;
generating a query plan for executing the query based at least in part on the predicted indicator of the amount of computing resources; and
executing the query based at least in part on the query plan.

\* \* \* \* \*